Figure 1:
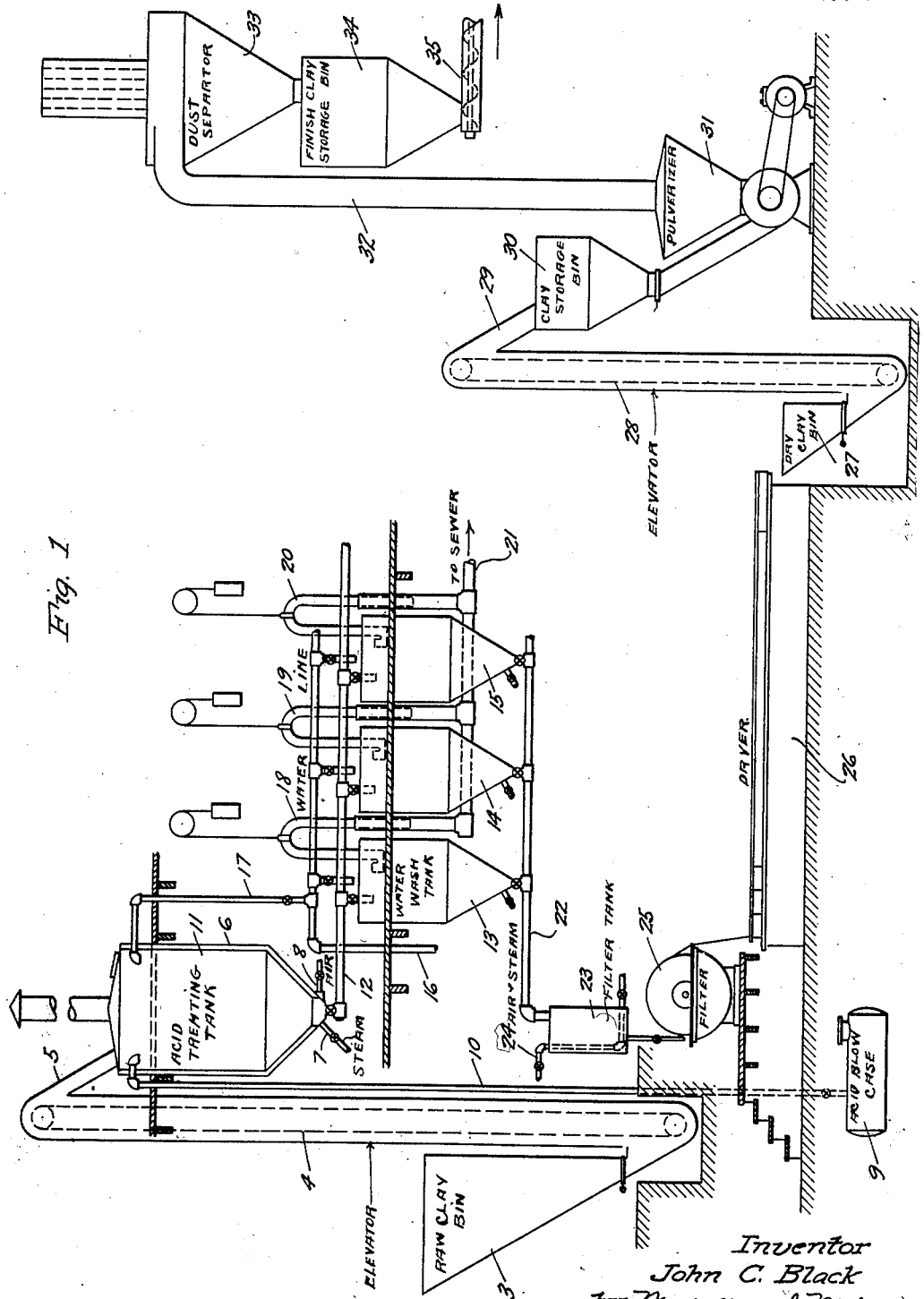

Jan. 24, 1928. 1,656,997

J. C. BLACK

PROCESS OF REFINING OIL

Filed April 5, 1920    2 Sheets-Sheet 1

Inventor
John C. Black
by Nestall and Nallaa
his Attorneys

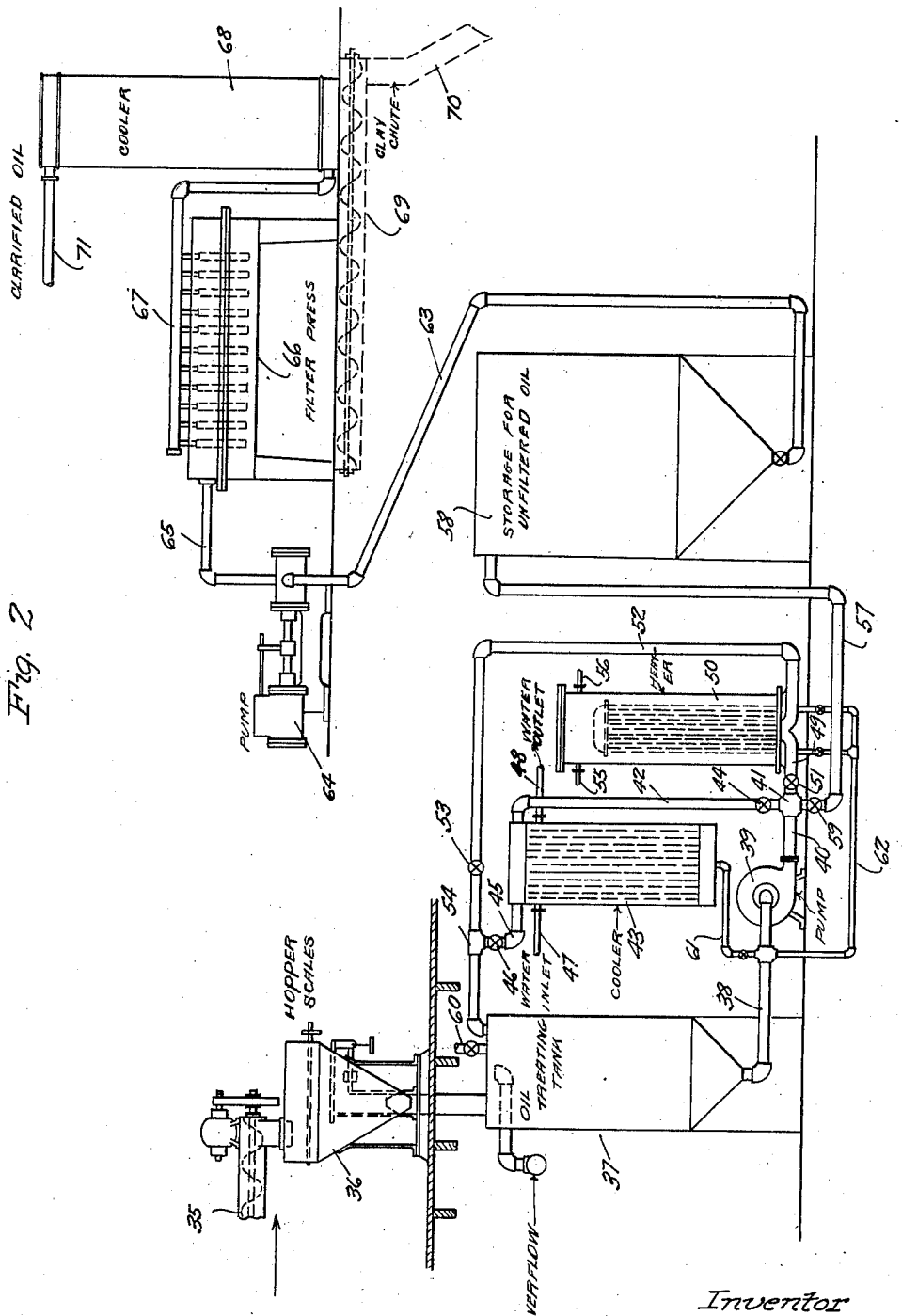

Patented Jan. 24, 1928.

1,656,997

UNITED STATES PATENT OFFICE.

JOHN C. BLACK, OF LOS ANGELES, CALIFORNIA.

PROCESS OF REFINING OIL.

Application filed April 5, 1920. Serial No. 371,399.

This invention relates to new and useful improvements in the art of treating oils for the purpose of improving their color and quality, thereby enhancing their market value.

At the present time there is a process extensively used for treating petroleum oils consisting in causing the oils to percolate through clay or fuller's earth. The fuller's earth or clay may be reclaimed by treatment with sulphuric or hydrochloric acid in combination with other steps.

My invention relates to a method of treatment of clay and subsequently treating the oil with the clay.

Some clays, such as the well known fuller's earth found in Florida, do not need an acid treatment to make them commercially profitable as a filtering agent for oil, although the acid treatment as before stated, is sometimes used on the partially spent clay to more or less restore its filtering qualities. However, there are other clays that show very little filtering qualities, if used as a natural filtering agent, that is, without chemical treatment; but in some cases these same clays may be treated so as to very materially improve their filtering qualities and even exceed the best natural clay, such as the Florida earth.

The methods now in common use employ a filtering bed of clay or fuller's earth, through which the oil is allowed to percolate. My method comprises mixing with the oil finely divided clay previously treated and then filtering the clay from the oil. By employing my method a greater yield of oil for a given amount of clay is obtained and better results are secured with respect to the color and qualities.

This invention will be best understood from the following description taken in connection with the accompanying drawings, illustrating diagrammatically means for carrying out the steps of the process in accordance with the principles of this invention. The drawings show in a general way certain means which may be employed in this process, but the invention is in no way limited to the means shown.

Fig. 1 shows the apparatus for completely treating the clay preliminary to its mixture with the oil; Fig. 2 shows the apparatus for treatment of the oil with the clay. However, the apparatus shown in Figs. 1 and 2 forms a complete system, wherein raw clay is introduced at one end and the refined oil removed at the other end the process being carried out continuously.

Referring particularly to Fig. 1, a bin for raw clay is indicated by 3. An elevator 4 lifts the clay from the bin to a chute 5, delivering it to an acid treating tank 6, the latter being preferably lined with lead.

To render the clay more easily and thoroughly acted upon by the chemical reagents employed, it is subdivided as finely as possible. This may be accomplished by agitating the clay in water, which is preferably heated by the use of open steam. The mass is also agitated by the steam, making more thorough the action of subdivision. The agitation may be accelerated by blowing air through the mass. To this end a steam supply pipe 7 equipped with a suitable valve communicates with the tank 6 at its bottom, and a similar air supply pipe 8 with a valve also communicates with the bottom of the tank. The mass reaches a state approaching a colloidal condition. Sulphuric acid is then added. Hydrochloric acid may be used and possibly other acids, but from a commercial standpoint sulphuric acid best serves the purpose. I prefer to use from one quarter to one half pound of sulphuric acid per pound of clay. These proportions may be varied to suit conditions. A better quality of filtering product may be obtained by the use of a greater quantity of acid than that above specified, but commercial considerations govern this, as the use of more acid reduces the yield of finished product. The optimum yield of finished clay should be obtained by the use of the minimum amount of acid consistent with the maximum yield of filtered oil. These factors have to be determined for each particular clay. The acid that I prefer to use is ordinary 66° Baumé acid, although weaker or stronger acid may be used without materially altering the resulting product. The acid is added to the clay in the tank while in a finely subdivided state. An acid blow case 9 serving as a source of acid supply communicates with the tank through a pipe 10. Water being present in the mass, the acid is very materially diluted. This dilution delays the action of the acid, and it may be hastened by evaporating a portion of the water by any method such as heating to cause evaporation, or by blowing hot air through the mixture, or by the use of a vacuum or a combination of these means.

The method I prefer is to bring the clay and water to a high temperature by the use of open steam, then to maintain as much heat as possible by using a steam jacket and blowing the heated air through the acid and water mixture. This step of the treatment is continued for several hours or until the acid action is complete. It is then ready to be washed with water to remove the sulphates produced by the acid action. These sulphates consist principally of aluminum, magnesium, calcium, and other metals which may be present in the clay. The action of the acid upon the clay is not well known. It may be one of purification or it may be one due to some chemical changes in the aluminum or silica or of their combination, or it may alter the clay physically. Whatever the action is, the change is a profound one, as the clay has taken on properties both physical and chemical that it did not previously have. The treatment which I employ comprehends not merely the disintegration of some of the constituent parts and the dissolving of other parts of the clay, but is an action upon the clay, whereby the product as a whole is different from the raw clay. The action upon the clay may be aptly termed digestion.

A discharge pipe 12 leads from the bottom of the tank 6 and has a number of branches controlled by valves for discharging the clay into water washing tanks indicated by 13, 14, and 15. A water line 16 has a discharge pipe to supply water to each of the washing tanks, and a branch 17 to supply water to the acid treating tank. Disposed in each of the wash tanks are siphons 18, 19, and 20, connected to a pipe 21 leading to a sewer or other point for wasting the wash water.

Water is first admitted to the acid treating tank through pipe 17. This dilutes the mass in the tank, which after the acid action has taken on a gelatinous appearance. The dilution is sufficient to cause it to flow and the water also serves to wash the clay.

The washing operation with water is continued in the washing tanks 13, 14, and 15, until the clay is practically free from the sulphates. The wash water is extracted in the apparatus illustrated by means of settling and decantation. However, any suitable method for separating the wash water from the clay may be used, such as any of the well known methods of mechanical filtration.

After the clay is thickened by setting, it is filtered by any of the well known filter machines or presses. The thickened clay is conducted from the wash tanks by a pipe 22 leading to a supply tank 23, through which passes a steam line 24 for the purpose of heating the mass thereby accelerating the filtering action. The clay passes from the supply tank to a mechanical filter 25 and is delivered therefrom to a drying table 26.

The drying table may consist of a hot plate and a reciprocating conveyer for moving the clay across the top. During this operation the clay is dried to bone dryness at a low heat not sufficient to cause decomposition. This point should not exceed around 300 degrees Fahrenheit; an excellent result may be had by not exceeding 225° Fahrenheit or just sufficient to cause evaporation of the free water. The clay as it passes from the table is in the form of dry cakes or lumps. In this form it is delivered to a dry clay bin 27, from which it is delivered by an elevator 28 to a chute 29 leading to a storage bin 30. From the storage bin the clay passes to a pulverizer 31. In this pulverizer it is ground to as fine a state as practically possible. The pulverized clay is blown through a pipe 32 to a separator 33, which may be of the well known cyclone type. The finished clay is then delivered to a storage bin 34, the latter being an air tight container, as the quality of the clay will deteriorate by exposure to the air.

The clay is now in condition to be mixed with the oil. To make a treatment of an oil with the finished clay, the dry clay is added to the oil and agitated by any suitable means, the time of agitation depending to a very great extent upon the temperature and viscosity of the oil. Apparently the higher the temperature the more rapid the action up to certain limits. However, when too high a temperature is employed, vaporization of the oil may take place and also severe oxidation. This oxidation may be sufficient to destroy the improved color obtained at a lower temperature. The temperature employed will also vary with the grade of oil under treatment. As a rule the heavier the oil the less the temperature at which it should be treated, the color degrading, with increasnig temperature. The heating of the oil under clay treatment apparently improves the quality of the oil by removing those bodies easily oxidized, and an oil so treated will maintain its color better than one treated cold or at a low temperature.

A conveyor 35 transfers clay from the storage bin 34 to a hopper scale 36. From the hopper scale the clay is discharged into an oil treating tank 37. A pipe line 38 is connected to a pump 39. The other side of the pump is connected by a pipe 40 to a cross 41. One branch of the cross is connected by a pipe 42 to a cooler 43. A valve 44 controls the flow of liquid through pipe 42. The cooler has a discharge pipe 45 and a control valve 46. The usual intake and discharge pipe for cooling water are indicated by 47 and 48. Another branch of the cross 41 is connected by a pipe 49 to a heater 50. Pipe 49 is controlled by a valve 51. The discharge of the heater is connected by a pipe line 52 to the treating tank 37, there being a valve 53 for controlling the flow of liquid therethrough. Pipe 45 leading from the cooler is connected by a T 54 to the pipe line 52. Suitable steam intake and discharge pipes indicated respectively by 55 and 56 are provided for the heater. Another branch of the cross 41 is connected by a pipe line 57 to a storage tank for filtering oil indicated by 58. A valve 59 controls the flow of liquid through pipe 57.

The oil and clay are treated in the following manner: Valves 44, 46, and 59 are closed, thereby cutting out the cooler and line to the storage tank. Valves 51 and 53 are opened, thereby placing the heater in circuit with the oil treating tank and the pump. The oil to be treated is introduced into the tank 37 through a pipe 60. The oil is then circulated until the desired temperature is reached, say 200° Fahrenheit. The proper amount of clay as measured out on the hopper scale is then introduced to the oil treating tank. The amount has been previously determined by experiment on a small sample of oil and clay. The oil and clay in the system are now treated continuously by circulation and the temperature brought to the point best suited for that particular oil, say from 250° Fahrenheit to 325° Fahrenheit. This temperature is maintained for a short period to insure good treatment of the oil, and valves 51 and 53 closed to cut out the heater. Valves 44 and 46 are now opened, and the mixture of oil and clay circulated through the cooler. After the treated oil has been cooled sufficiently, the cooler 43 is cut out by closing valves 44 and 46, and valve 59 opened. The oil is now pumped from the oil treating tank to the unfiltered oil storage tank 58. A drain line 61 leads from the cooler 43 to the suction of the pump 39, and another drain line 62 leads from the heater to the suction of the pump.

The oil is next passed through a suitable filtering press or machine to separate the clay and the oil. The oil is then delivered from the machine to a cooler. The oil must be cool before it is stored, and during cooling should not be exposed to the atmosphere.

A pipe line 63 is connected to the intake of a pump 64 which delivers the mixture of oil and clay from the storage tank 58 and clay through discharge line 65 to a filter press 66. The oil passes from the filter press by a pipe line 67 to a cooler 68. The spent clay is delivered by a conveyor 69 to a chute 70. This completes the treatment of the oil. From the cooler the oil is delivered by a pipe line 71 to a finished oil storage tank.

What I claim is:

1. A process of refining hydrocarbon oil comprising commingling an acid treated adsorbent clay and oil, subjecting the mixture to an agitating and heating step, regulating the degree of heat for that particular oil so that a rapid reaction of the clay with the oil results, then reducing the temperature and separating the oil and clay.

2. A process of refining hydrocarbon oil comprising commingling an acid treated pulverized adsorbent clay and oil, subjecting the mixture to an agitating and heating step, regulating the degree of heat for that particular oil whereby a rapid reaction of the clay with the oil results, then partially cooling the mixture to a point below rapid oxidation, then separating the oil and the clay and finally cooling the oil.

3. A process of refining hydrocarbon oil comprising commingling an acid treated adsorbent clay and oil, subjecting the mixture to an agitating and heating step, regulating the degree of heat for that particular oil whereby a rapid reaction of the clay with the oil results, and wherein the clay adsorbs coloring matter and oxidation products resulting from the heating step, then separating the clay and oil.

4. A process of refining hydrocarbon oil comprising commingling an acid treated adsorbent clay and oil, subjecting the mixture to an agitating and heating step, regulating the heat for that particular oil whereby a rapid reaction of the clay with the oil results, and wherein the clay adsorbs coloring matter and oxidation products resulting from the heating step, then partially cooling the mixture to a point below rapid oxidation, then separating the oil and the clay and further cooling the oil to produce a decolorized and otherwise improved product.

5. A process of treating petroleum oils which comprises heating said oil in contact with a pulverized acid treated adsorbent clay to a temperature of reaction, agitating said oil and clay, and separating from said oils the clay and adsorbed bodies which act to color said oil.

6. The process of treating oil which consists in mingling with it by agitation acid treated clay, agitating and heating the same to a reactive temperature, and separating out the clay and other impurities.

In witness that I claim the foregoing I have hereunto subscribed my name this 29th day of March, 1920.

JOHN C. BLACK.